US012646257B2

(12) United States Patent
Zakhor et al.

(10) Patent No.: US 12,646,257 B2
(45) Date of Patent: Jun. 2, 2026

(54) REFINING WIREFRAME BUILDING MODELS USING POINT CLOUDS

(71) Applicant: Signetron Inc., Berkeley, CA (US)

(72) Inventors: Avideh Zakhor, Berkeley, CA (US); Zachary Van Hyfte, San Diego, CA (US)

(73) Assignee: Signetron Inc., Berkeley, CA (US)

( * ) Notice: Subject to any disclaimer, the term of this patent is extended or adjusted under 35 U.S.C. 154(b) by 128 days.

(21) Appl. No.: 18/893,734

(22) Filed: Sep. 23, 2024

(65) Prior Publication Data

US 2026/0087742 A1      Mar. 26, 2026

Related U.S. Application Data

(63) Continuation of application No. 18/892,361, filed on Sep. 21, 2024.

(51) Int. Cl.
G06T 17/20      (2006.01)
G06T 19/20      (2011.01)
(52) U.S. Cl.
CPC ............ G06T 17/205 (2013.01); G06T 19/20 (2013.01); *G06T 2210/04* (2013.01); *G06T 2219/2012* (2013.01)
(58) Field of Classification Search
None
See application file for complete search history.

(56) References Cited

U.S. PATENT DOCUMENTS

| | | | |
|---|---|---|---|
| 8,654,130 B2 * | 2/2014 | Ostermann | ............. G06T 13/40 |
| | | | 345/475 |
| 9,709,513 B2 * | 7/2017 | O'Hare | ................... G06T 17/20 |
| 11,574,442 B2 * | 2/2023 | Sun | .......................... G06T 15/20 |
| 11,935,209 B1 * | 3/2024 | Barsky | .................... G06T 15/20 |
| 2018/0197312 A1 * | 7/2018 | Ostermann | ............ H04N 19/36 |
| 2025/0054267 A1 * | 2/2025 | Maldonado | ............. G06T 17/20 |

* cited by examiner

*Primary Examiner* — Talha M Nawaz
(74) *Attorney, Agent, or Firm* — KALI LAW GROUP, P. C

(57)      ABSTRACT

Methods for fenestration delineation of a building wireframe model are presented, the methods including: providing a point cloud of a building; providing the building wireframe model generated from the point cloud, generating a number of façade slices from the point cloud and the building wireframe model; selecting one of the façade slices; displaying the selected façade slice; selecting a number of points on the selected façade slice, where the points correspond with corners of a fenestration; connecting the corners to present an outline of the fenestration; displaying the outline on the façade slice; and adjusting the corners by a user to match the fenestration, where the adjusting the corners to match the fenestration occurs any time after the selecting the points.

10 Claims, 13 Drawing Sheets

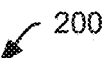
FIG. 2A
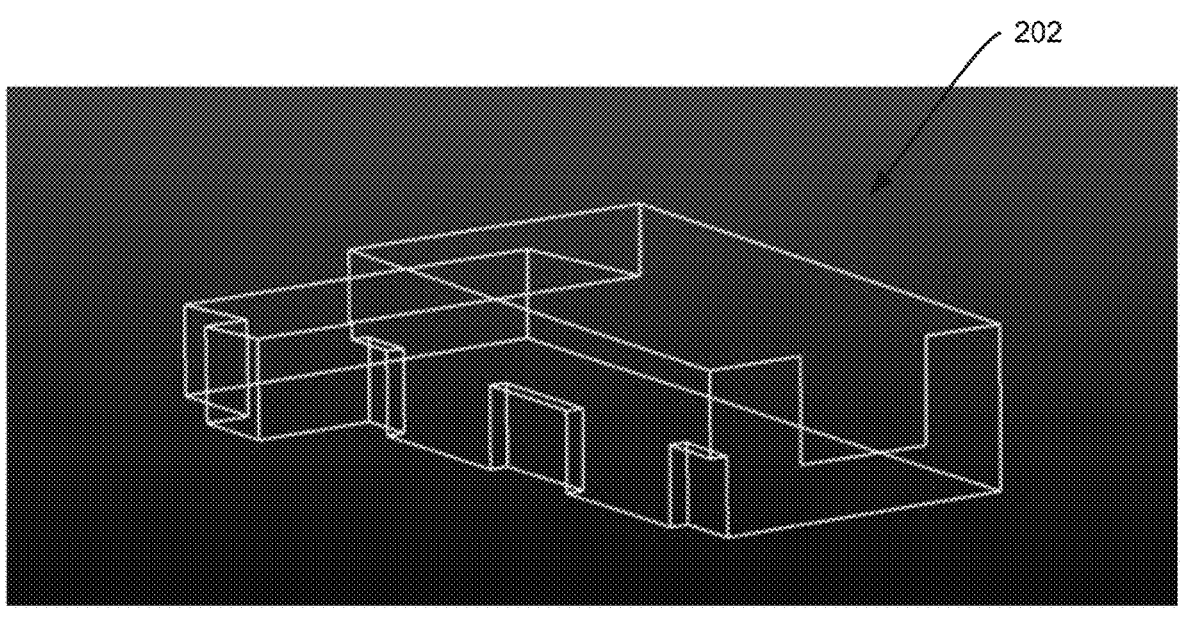
FIG. 2B

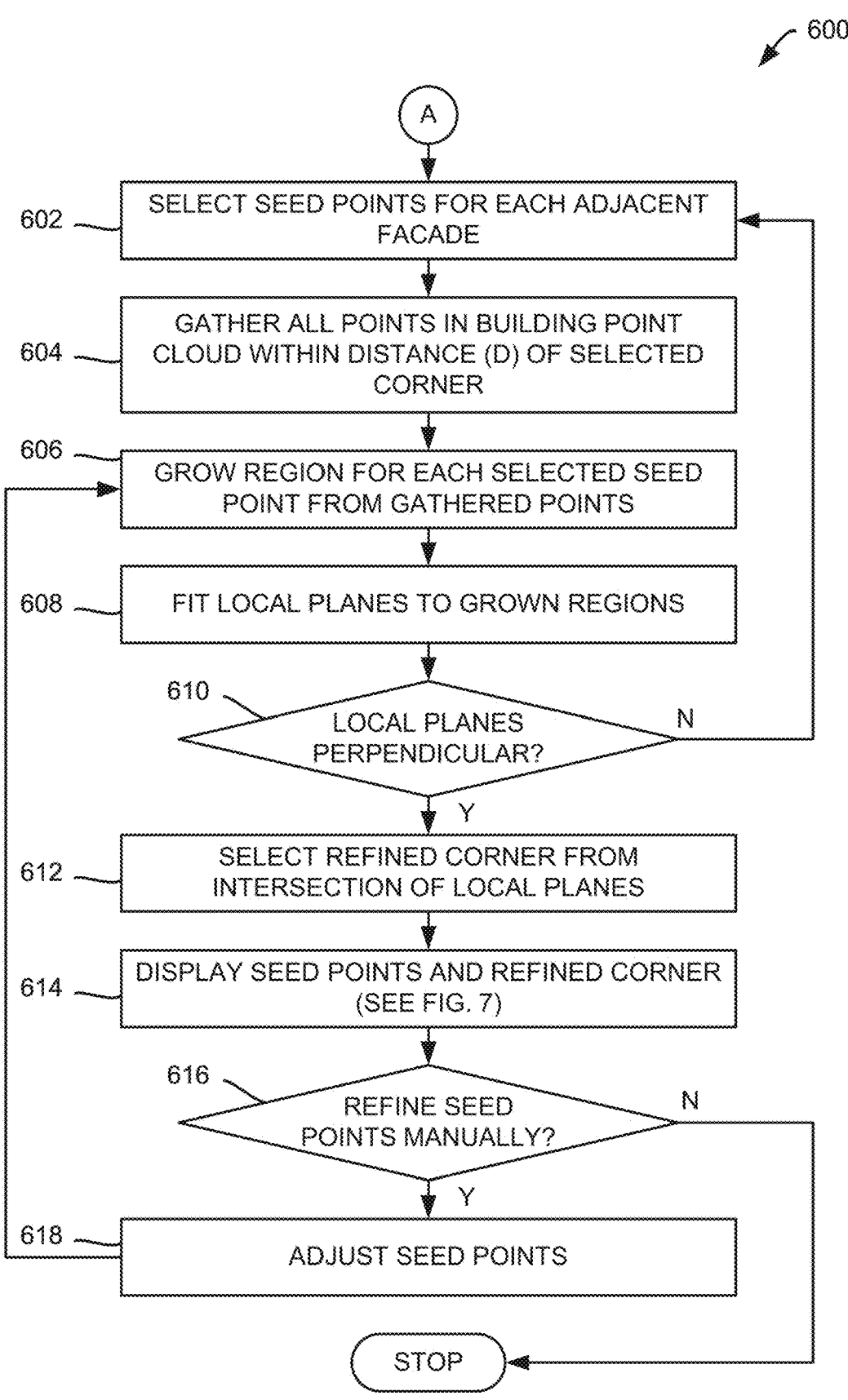

600

A

602 — SELECT SEED POINTS FOR EACH ADJACENT FACADE

604 — GATHER ALL POINTS IN BUILDING POINT CLOUD WITHIN DISTANCE (D) OF SELECTED CORNER

606 — GROW REGION FOR EACH SELECTED SEED POINT FROM GATHERED POINTS

608 — FIT LOCAL PLANES TO GROWN REGIONS

610 — LOCAL PLANES PERPENDICULAR?   N

Y

612 — SELECT REFINED CORNER FROM INTERSECTION OF LOCAL PLANES

614 — DISPLAY SEED POINTS AND REFINED CORNER (SEE FIG. 7)

616 — REFINE SEED POINTS MANUALLY?   N

Y

618 — ADJUST SEED POINTS

STOP

REFINING WIREFRAME BUILDING MODELS USING POINT CLOUDS

BACKGROUND

The first step in renovating, retrofitting, or recladding a building is often to create a dimensionally accurate 3D model of the building. For recladding projects, which involve completely covering the exterior of a building with insulation panels to improve its energy efficiency, the exterior facades of the building need to be modeled with extreme precision to ensure that the insulation panels are sized such that they cover the entirety of the building with minimal gaps. Typically, building models are created by first using a 3D laser scanner to capture a point cloud of the building and then using scan-to-BIM software to develop a building model based on the point cloud. However, the vast majority of existing building modeling software is built to work with designs for new buildings, which are uniformly vertical, true, and level, with near-perfect 90° angles. This makes these industry-standard software packages ill-suited for creating models of older buildings whose edges and angles are not as straight and uniform and whose facades have buckled and warped over time.

As such, methods for refining wireframe building models using point clouds are presented here.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for fenestration delineation of a building wireframe model are presented, the methods including: providing a point cloud of a building; providing the building wireframe model generated from the point cloud, generating a number of façade slices from the point cloud and the building wireframe model; selecting one of the façade slices; displaying the selected façade slice; selecting a number of points on the selected façade slice, where the points correspond with corners of a fenestration; connecting the corners to present an outline of the fenestration; displaying the outline on the façade slice; and adjusting the corners by a user to match the fenestration, where the adjusting the corners to match the fenestration occurs any time after the selecting the points. In some embodiments, methods further include: coloring all points of the selected façade slice using a coloring function to reveal details corresponding with the fenestration; and adjusting the corners by the user to match the fenestration based on the coloring. In some embodiments, the coloring function is selected from the group consisting of: height ramp coloring function, verticality coloring function, and normal change rate coloring function. In some embodiments, methods further include: adjusting a coloring function parameter; and displaying the selected façade slice using the adjusted coloring function. In some embodiments, the coloring function parameter corresponding with the height ramp coloring function is a banding frequency. In some embodiments, the coloring function parameter corresponding with the verticality coloring function is a neighborhood radius. In some embodiments, the coloring function parameter corresponding with the normal change rate coloring function is a neighborhood radius.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A-2B are illustrative representations of a point cloud and wireframe building model in accordance with embodiments of the present invention;

FIG. 6 is an illustrative flowchart of methods for automated corner refinement in accordance with embodiments of the present invention;

DETAILED DESCRIPTION

Figure 1:
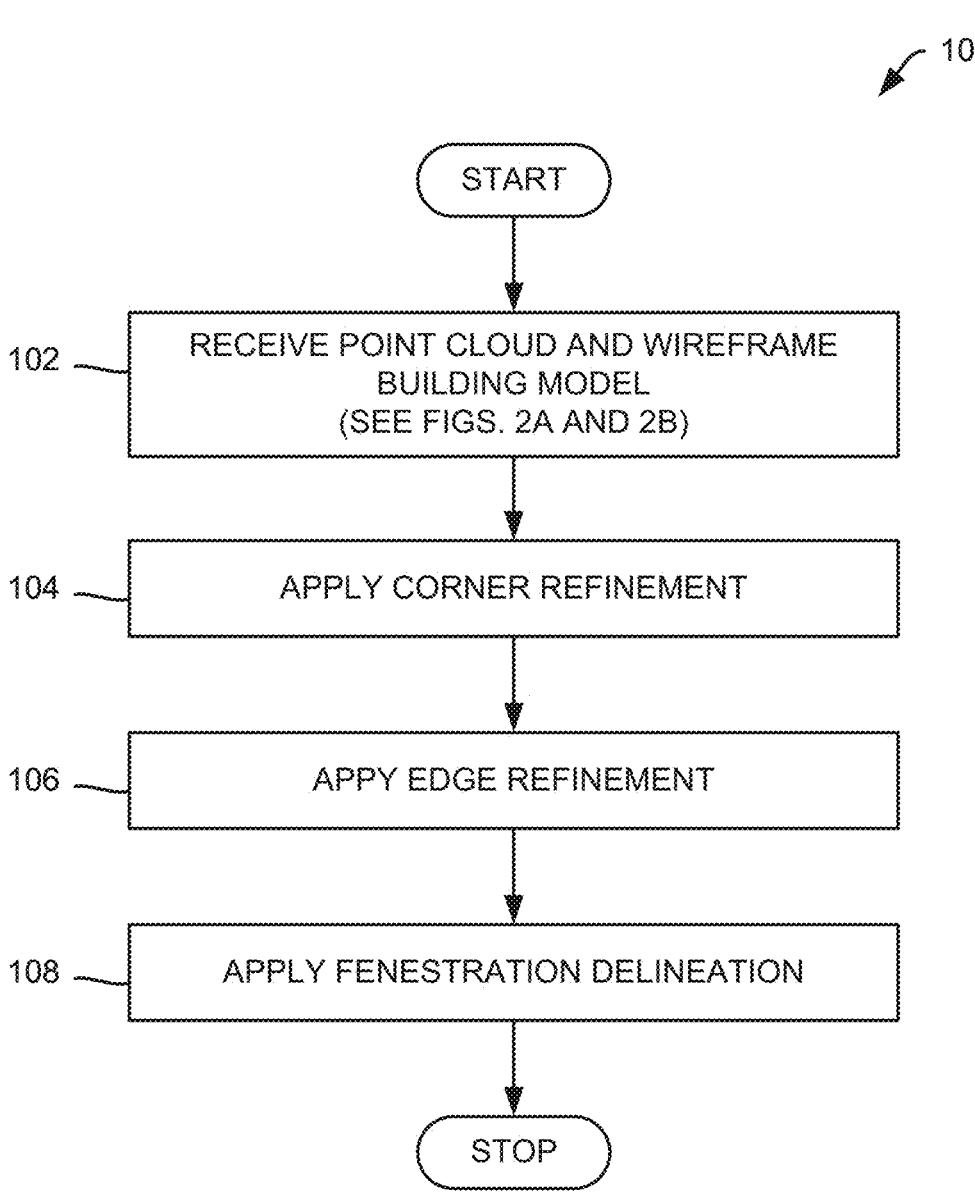
FIG. 1 is an illustrative flowchart of methods for refining wireframe building models using point clouds in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well-known process steps and/or structures have not been described in detail in order to not unnecessarily obscure the present invention.

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals/per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

FIG. 1 is an illustrative flowchart 100 of methods for refining wireframe building models using point clouds in accordance with embodiments of the present invention. In particular, flowchart 100 provides an overview of methods utilized to achieve a refined wireframe building model in any combination or sequence. At a first step 102, the method receives a point cloud and a building wireframe model corresponding with the point cloud. As noted above, point clouds are well-known in the art and are created by utilizing a 3D laser scanning system. Turning briefly to FIG. 2A, FIG. 2A is an illustrative representation of point cloud 200. A point cloud is a discrete set of data points in space. The points may represent a 3D shape or object such as a building. Any method of capturing a point cloud may be utilized without limitation and without departing from embodiments disclosed herein. Like point clouds, wireframe building models are well-known in the art. FIG. 2B is an illustrative representation of wireframe building model 202 that corresponds with point cloud 200. Wireframe building models are generated from point clouds and correspond to the buildings captured in the point clouds. Returning to FIG. 1, at a next step 104, the method applies corner refinement. Corner refinement allows users to interactively edit the corners of the wireframe building model so that the model more accurately reflects the non-idealities of the source building. At a next step 106, the method applies edge refinement. Like corner refinement, edge refinement allows users to interactively edit the edges of the wireframe building model so that the model more accurately reflects the non-idealities of the corresponding source building. At a next step 108, the method applies fenestration delineation. Fenestration delineation allows users to create and edit high-precision outlines of doors and windows with the aid of visualizations designed to make the precise contours of window and door frames in the building point cloud more clearly visible.

Corner Refinement

Figure 3:
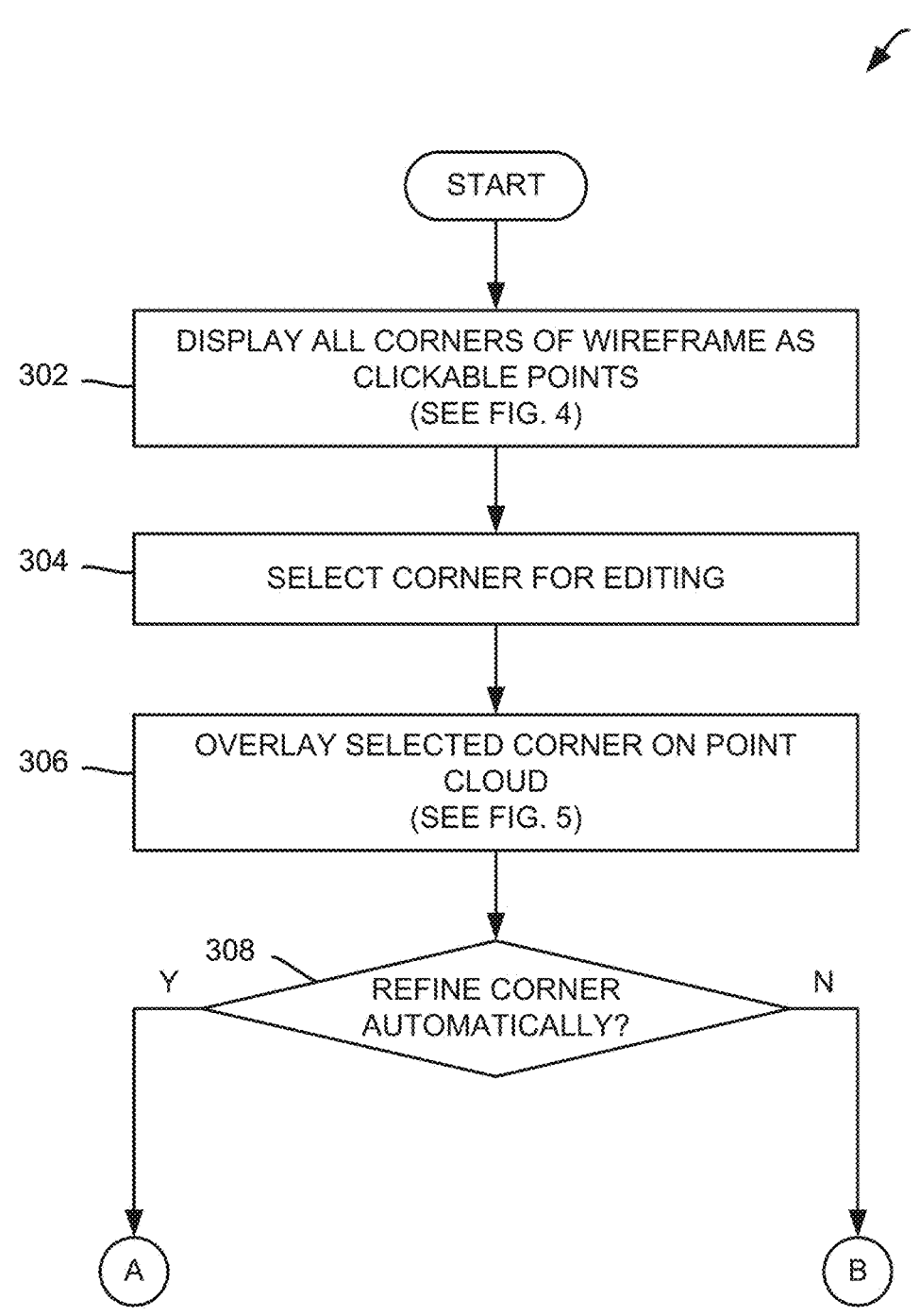
FIG. 3 is an illustrative flowchart of methods for corner refinement in accordance with embodiments of the present invention.
Figure 4:
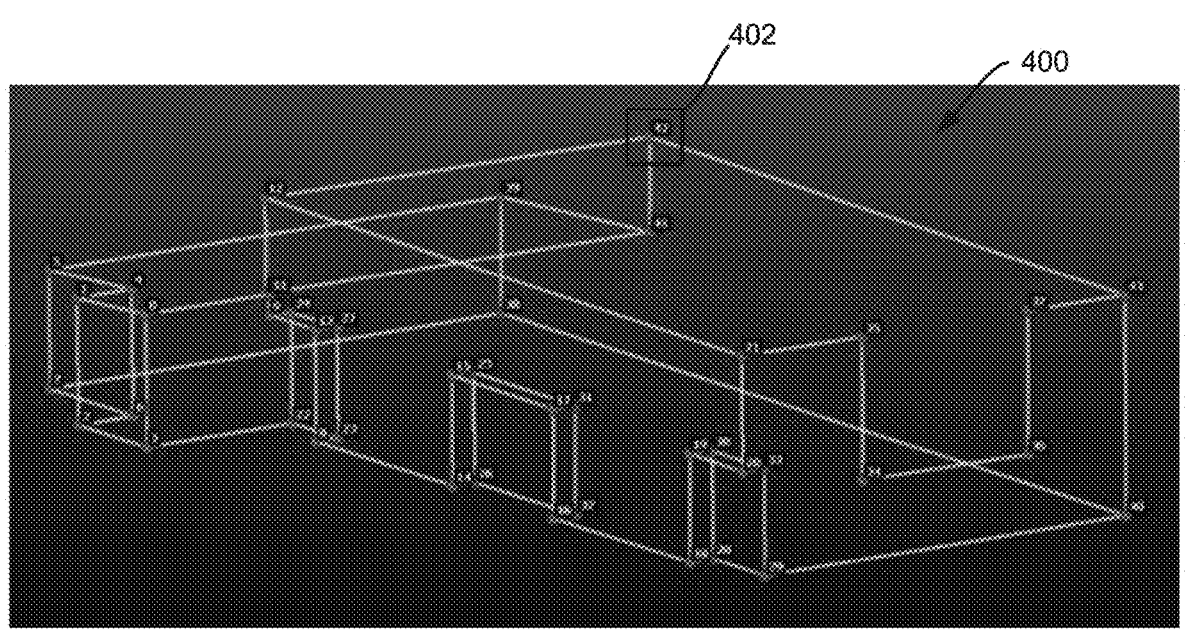
FIG. 4 is an illustrative representation of a wireframe building model with selectable corners in accordance with embodiments of the present invention.

FIG. 3 is an illustrative flowchart 300 of methods for corner refinement in accordance with embodiments of the present invention. In wireframe building models contemplated herein, the edges of each facade form a planar polygon—all of the corners of a given facade lie within the plane that was created for that facade as part of the process of generating the model. Corner refinement methods can be used to adjust the positions of the individual corners of wireframe building models to more precisely match the positions of the true building corners, such that the corners of each facade are no longer necessarily coplanar. This adjustment can be performed either automatically by software or interactively by the user. Methods can analyze the geometry of the parts of the building point cloud immediately surrounding the corner to automatically compute a more precise position for the corner. Alternatively, a user can interactively move the corner around either by clicking different spots on the point cloud or by "nudging" the corner using the arrow keys on their keyboard. In the point cloud provided (see FIG. 1) the building wireframe model includes any number of façades where each façade forms a planar polygon, and each planar polygon includes any number of corners. As such, at a first step 302, the method displays all corners of a wireframe building model as user clickable (or user selectable) points. Turning briefly to FIG. 4, FIG. 4 is an illustrative representation of wireframe building model 400 with selectable corners 402 in accordance with embodiments of the present invention. In some embodiments, each corner is assigned a permanent ID number that is displayed next to it, which provides easy identification for the user. In embodiments, the user can show or hide these ID numbers as needed. Returning to FIG. 3, at a next step 304, the user selects a corner for editing. At a next step 306, the method overlays the selected corner on the point cloud, showing that portion of the point cloud where the selected corner is located.

Figure 5:
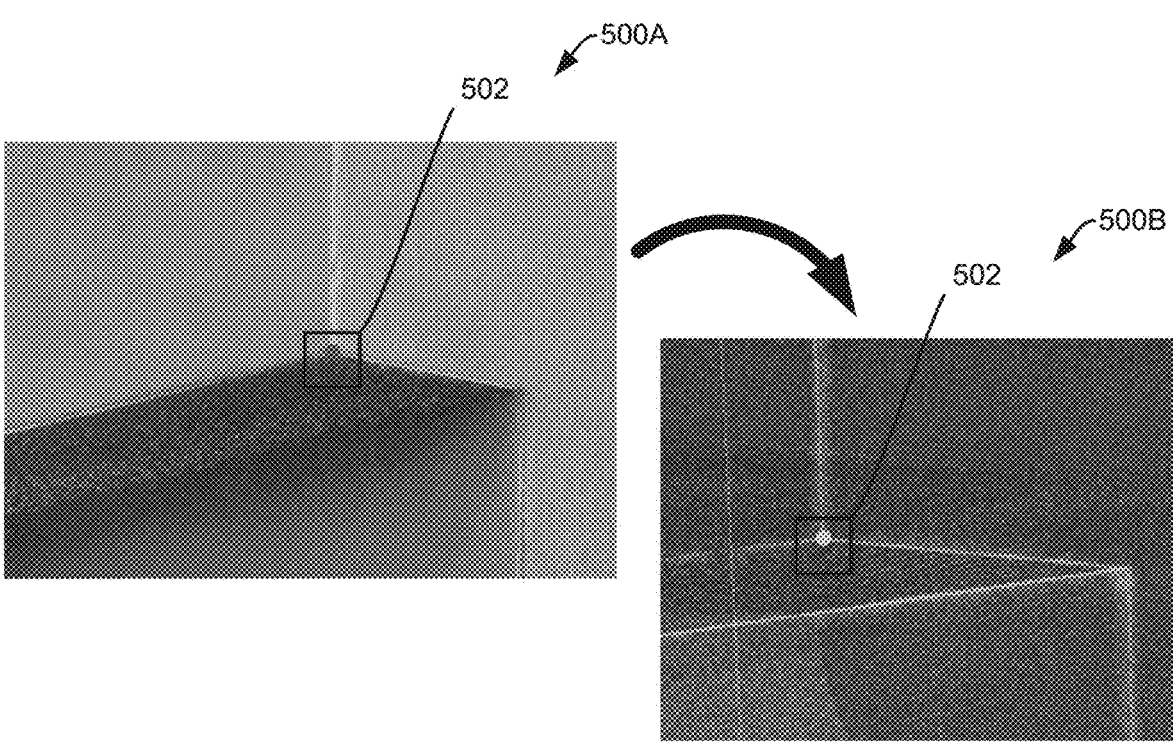
FIG. 5 is an illustrative representation of a portion of a point cloud with a selected corners in accordance with embodiments of the present invention.
Figure 9:
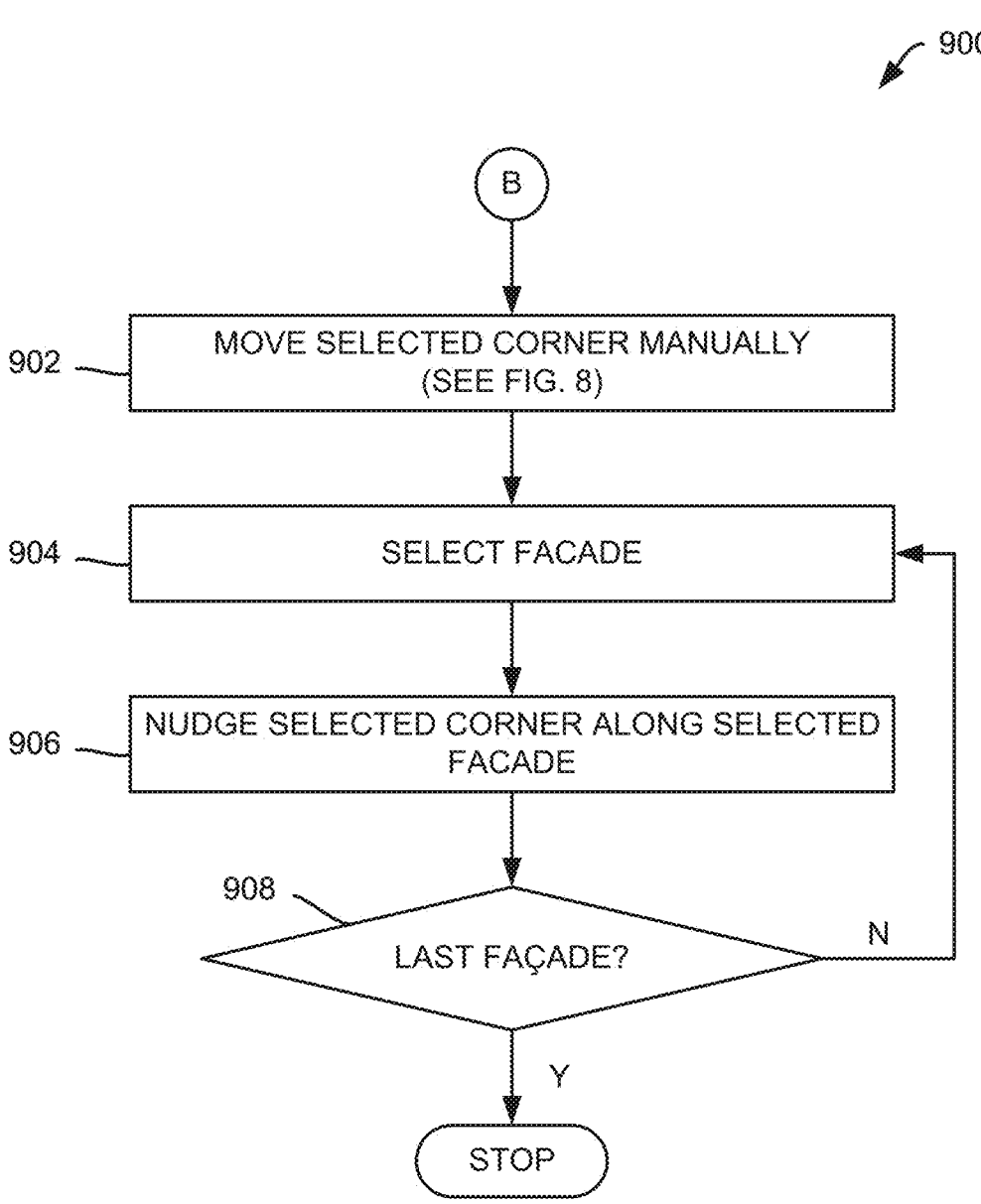
FIG. 9 is an illustrative flowchart of methods for manual corner refinement in accordance with embodiments of the present invention.

Turning briefly to FIG. 5, FIG. 5 is an illustrative representation of a portion of point cloud with selected corner 502 in accordance with embodiments of the present invention. In particular, FIG. 5 illustrates unhighlighted point cloud 500A and highlighted point cloud 500B each with selected corner 502. In embodiments, methods highlight portions of a point cloud in order to more clearly distinguish geometry surrounding a selected corner. To generate this coloring, the method first gathers all of the points in the building point cloud that are within a highlighting distance of the corner being edited (the selected corner). In some embodiments, the highlighting distance is in a range of approximately 20.0 to 100.0 cm. In a preferred embodiment, the highlighting distance is approximately 80.0 cm. The method then computes surface variation values for all points gathered and colors all points gathered in accordance with surface variation values to highlight the surrounding geometry. Only coloring the part of the point cloud near the corner being edited (highlighting distance) minimizes the amount of time that the user spends waiting for the coloring to be generated. Returning to FIG. 3, at a next step 308, the method determines whether to refine the corner automatically. If the method determines at a step 308 to refine the corner automatically, the method continues to a step 602 (FIG. 6). If the method determines at a step 308 not to refine the corner automatically, the method continues to a step 902 (FIG. 9).

FIG. 6 is an illustrative flowchart 600 of methods for automated corner refinement in accordance with embodiments of the present invention. In particular, FIG. 6 continues from a step 308 (FIG. 3). In automated corner refinement, methods utilize the geometry of the point cloud near the selected corner being edited to automatically calculate a more precise position for the selected corner. Specifically, methods fit small local planes to nearby portions of the facades or surfaces that are adjacent to the selected corner and find the point at which those planes intersect. For the facades of a building, a facade segmentation process automatically segments out exactly those points from the point cloud that belong to each facade, such that a point cloud "slice" is created for each facade. Planes are fitted to each of those slices, generating simplified planar representations of each of the facades ("facade planes"). An algorithm such as Random Sample Consensus (RANSAC) may be utilized to generate these planar representations. Each of the facade corners in the initial wireframe models output by the pipeline sits at the intersection of three planes; for most facade corners, all three of those "source planes" are facade planes, but the corners that touch either the ground or in some cases the roof of the building sit at the intersection of two facade planes and a "ground plane" or "roof plane" that's automatically created as part of the pipeline.

As such, at a first step 602, the method selects a seed point for each façade adjacent to the selected corner, each seed point being within a seed point distance of the selected corner. For each of the corner's source planes P, the tool examines the edges of the corresponding facade or surface F in the wireframe model, calculating the line that bisects the angle formed by the two edges of F that touch the corner; this bisecting line passes straight through the facade corner. If P is the ground plane or the roof plane, it may not have any associated edges present in the wireframe model; in this case, the two edges used to form the angle are the two lines that result from intersecting P with the other two source planes for the corner. The method then chooses between two candidate "seed targets" on the bisecting line: one inside the angle formed by the two facade edges and one outside of it, both approximately 10.0 to 30.0 cm (seed point distance) from the corner. In some embodiments the seed point distance is preferably approximately 15.0 cm. Only one of these candidates actually lies within the bounds of F. If P is a facade plane, the candidate chosen as the seed target is the one that lies inside the bounds of the polygon formed by the edges of F; otherwise, if P is the ground plane or the roof plane, the candidate for which the minimum distance to a point in F's slice is the shortest is chosen as the seed target. The seed targets are constructed such that they lie on P, but because the actual facade or surface F is not perfectly planar and may be up to several centimeters apart from P at any given spot, the actual seed point chosen for each facade/surface F is the closest point in F's slice to the seed target.

At a next step 604, the method gathers all points of the point cloud within a gathered distance of the selected corner. In embodiments, the gathered distance is in a range of approximately 50.0 to 100.0 cm. In some embodiments, the gathered distance is preferably approximately 80.0 cm. At a next step 606, the method grows a region for the selected seed points with the gathered points in the point cloud for each façade. The method grows three regions, one from each seed point, on this small section of the point cloud surrounding the selected corner. At a next step 608, the method fits a local plane to the region for each façade. The method utilizes RANSAC to fit a plane to each of the grown regions. These small local planes reflect the particular geometry of the area near the selected corner much more accurately than their corresponding facade planes do. Because a facade plane is fitted to all of the points in the entire facade slice, the façade plane's shape is usually not influenced to a significant degree by the particular geometry of the areas close to the corners.

Sometimes, due to the unstructured nature of the building point cloud, the seed points automatically chosen by the method are in non-ideal locations—on fixtures or trim pieces attached to the building, on vegetation near the bottoms of walls, or in areas where the density of the point cloud is extremely low. When the seed point for a facade/surface isn't on the facade/surface itself, the region grown from the seed point won't be either, and the eventual plane intersection point used as the refined corner position won't be near the true building corner. Once local planes have been fitted to the grown regions for all three adjacent facades/surfaces, the tool attempts to automatically check for wrongly placed seed points and correct their positions. In theory, the three facades adjacent to a corner should be roughly perpendicular to each other, and thus the normal vectors of the three local planes should be roughly perpendicular to each other as well. As such, at a step 610, the method determines whether the local planes are perpendicular to each other to within a threshold of approximately 30 to 60 degrees. If the angle between the normal vectors of any two of the three local planes is below the threshold, the method calculates a new refined corner from scratch by following the same exact process detailed above, only this time using seed targets that are 40.0 to 80.0 cm away from the selected corner. Although they are further away from the corner and thus further away from the areas that should be the focus of the grown regions, these second-round seed points are closer to the centers of their respective facades/surfaces, and therefore less likely to be on fixtures, trim pieces or in low-density pockets of the point cloud. Thus, if the method determines at a step 610 that the local planes are not perpendicular, the method returns to a step 602 to select seed points for each adjacent façade.

Figure 7:
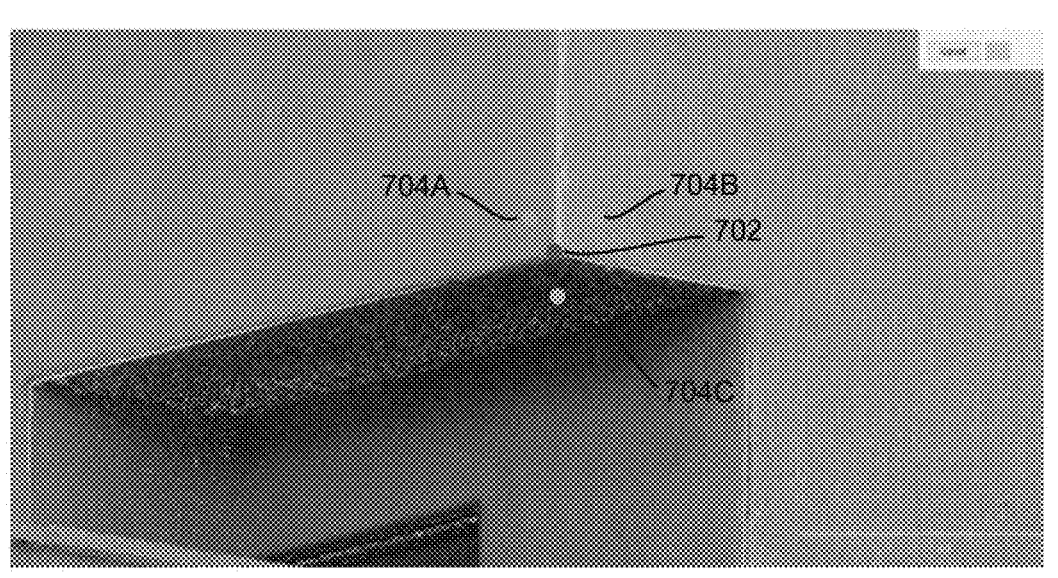
FIG. 7 is an illustrative representation of a point cloud portion with refined corners and seed points in accordance with embodiments of the present invention.

If the method determines at a step 610 that the local planes are perpendicular, the method continues to a step 612 to select a refined corner from an intersection of the local planes. That is, the point at which the three local planes intersect is chosen by the method to be the refined corner. This intersection point is almost always closer to the true building corner than the intersection of the facade planes. At a next step 614, the method displays the seed points and the refined corner. In an embodiment, once the method has finished calculating the refined corner, the selected corner point that's overlaid on the point cloud will jump to the refined corner so the user can preview the effects of the change. Turning briefly to FIG. 7, FIG. 7 is an illustrative representation of point cloud portion 700 with refined corner 702 and seed points 704A, 704B, and 704C in accordance with embodiments of the present invention. In particular, FIG. 7 illustrates a result of a step 614 (FIG. 6). Returning to FIG. 6, at a next step 616, the method determines whether to refine seed points manually. As an additional refinement, if neither the first nor the second round of the method's calculations result in a refined corner that is near the true building corner, the method also allows the user to interactively move the seed points to different positions. As such, if the method determines at a step 616 to refine seed points manually, the method continues to a step 618 to adjust the seed points by the user, whereupon the method continues to a step 606 to grow regions for each new seed point. If the method determines at a step 616 to not refine seed points manually, the method ends.

Figure 8:
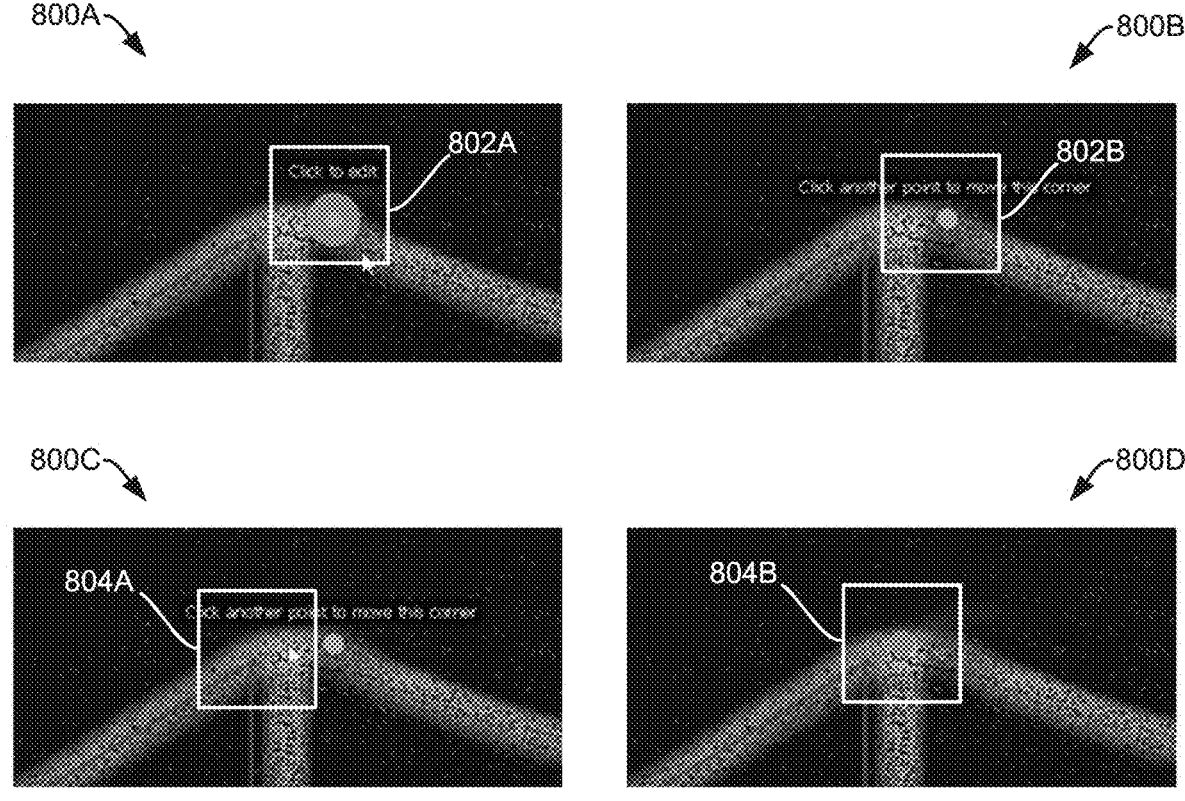
FIG. 8 is an illustrative representation of views of a point cloud portion with a selected corner in accordance with embodiments of the present invention.

FIG. 9 is an illustrative flowchart 900 of methods for manual corner refinement in accordance with embodiments of the present invention. In particular, FIG. 9 continues from a step 308 (FIG. 3). In embodiments, the method provides the user the option of moving the corner point directly. As such, at a first step 902, the method moves the selected corner point manually. In operation, a user can "pick up" the selected corner point and move it to a new position by pointing and clicking. Turning briefly to FIG. 8, FIG. 8 is an illustrative representation of views 800A-800D of a point cloud portion with a selected corner in accordance with embodiments of the present invention. As shown in FIG. 8, in an embodiment, when the user hovers their cursor near the selected corner point, it will be highlighted (802A), indicating that they can click to edit it. If they click the selected corner point, the point will turn orange (802B), indicating that it's selected for editing. When the corner point is selected for editing, the user can click any other point (804A) in the point cloud to move the selected corner point to the refined corner point (804B). In other embodiments, a user may simply click on a selected corner and drag it to a new refined corner point.

Returning to FIG. 9, it's often difficult for a user to place the corner point at the correct 3D position given that they're limited to picking points on a 2D screen. It generally takes several tries to pick out a custom corner point that's positioned correctly in all three dimensions. Accordingly, methods disclosed provide the ability for the user move the corner point in a more fine-grained, systematic manner by "nudging" it up, down, left, or right parallel to one of the adjacent facades/surfaces, with a granularity of up to approximately 1.0 mm. As such, at a step 904 the method selects a façade along which a selected corner may be nudged. In embodiments, any façade may be selected along which a selected corner may be nudged. However, it may be preferred to select a façade that is adjacent to the selected corner to be nudged. At a next step 906, the method nudges the selected corner along the selected façade. In embodiments, a selected corner may be nudged a nudge distance in a range of approximately 0.25 to 16.0 mm. At a next step 908, the method determines whether the last façade has been selected along which the selected corner will be nudged. If the method determines at a step 908 that the last façade has been selected, the method returns to a step 904 to select a façade. If the method determines at a step 908 that the last façade has been selected, the method ends.

Edge Refinement

Figure 10:
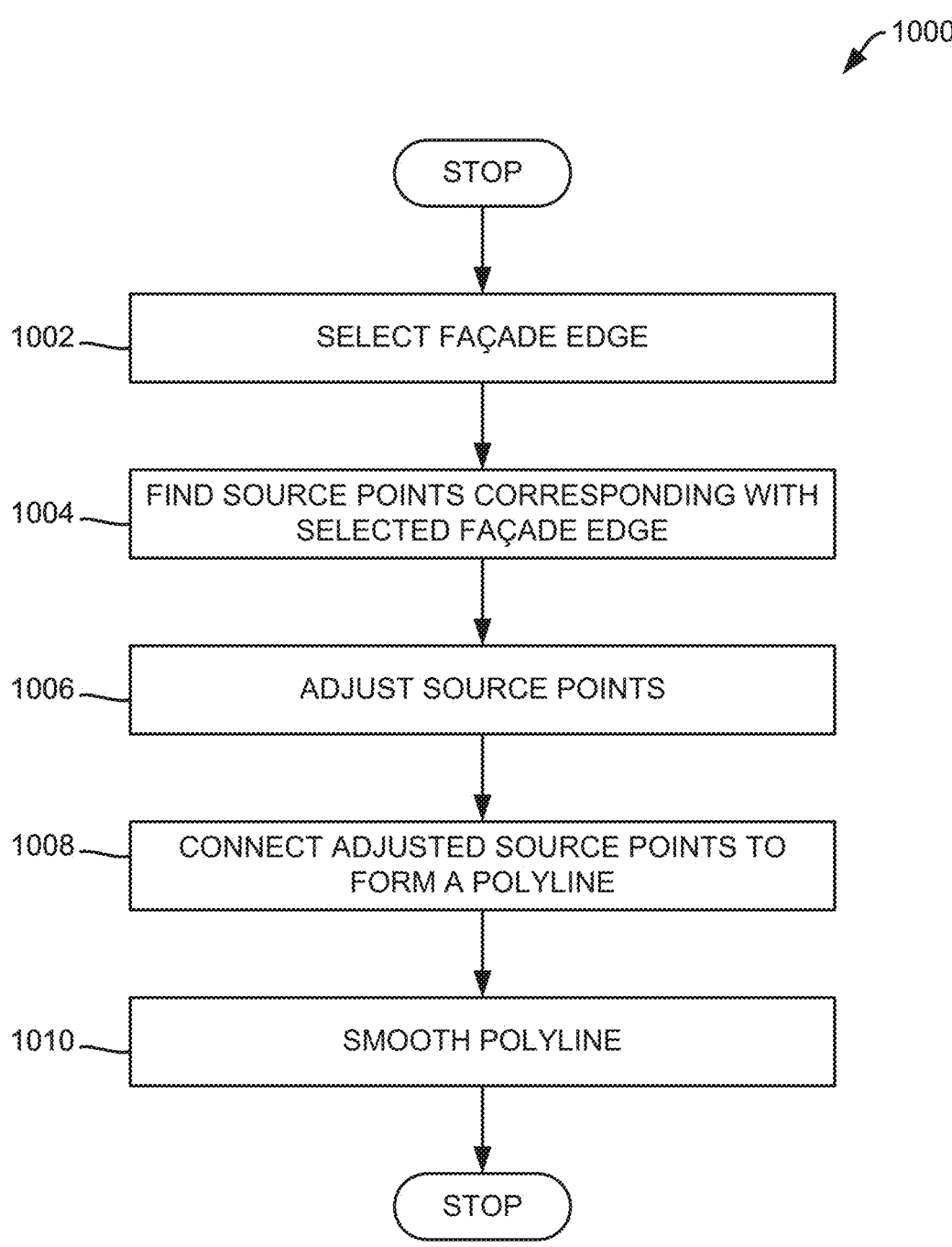
FIG. 10 is an illustrative flowchart of methods for edge refinement in accordance with embodiments of the present invention.

FIG. 10 is an illustrative flowchart 1000 of methods for edge refinement in accordance with embodiments of the present invention. As utilized herein, the terms façade edge and edge are utilized interchangeably. In an unrefined wireframe building model, all of the facade edges are perfectly straight lines connecting one facade corner directly to another. This approximation may be acceptable for certain new designs, but it doesn't provide the level of precision required when recladding older buildings whose edges and angles are rarely so straight and uniform. In addition, older building facades have often buckled and warped over time, giving their edges a subtle overall curvature. Methods for edge refinement can analyze the geometry of the point cloud area surrounding a facade edge to help the user quickly and interactively transform the straight edge from the wireframe model into a subtle curve that precisely matches the true building edge. To do this, the method first analyzes the geometry of the parts of the building point cloud immediately surrounding the edge to automatically find a set of "source points" that seem to lie on the true building edge. The user can then review the source points found by the tool and interactively adjust their positions, either by pointing and clicking or by "nudging" them using the arrow keys on their keyboard. The method then connects the adjusted source points together into a rough polyline that traces the true building edge and then smooths the polyline so that it matches the gradual curvature of the facade edge.

As such, at a first step 1002, the method selects a façade edge for refining. In an embodiment, when a user hovers their cursor near one of the facade edges in the wireframe building model, that façade edge will be highlighted, indicating that the façade edge may be selected. In embodiments, a selected façade edge includes two endpoints. At a next step 1004, the method finds all source points corresponding with the selected façade edge. As utilized herein, source points are points that appear to lie precisely on the true building edge. Finding source points will be discussed in further detail below for FIG. 11. At a next step 1006, the method adjusts the source points. As with corner points, source points may be individually moved. That is, a user can examine a source point and, if needed, interactively adjust the source point position to ensure that it lies exactly on the true building edge. As contemplated herein, a user may move a source manually by dragging it using a pointing device or by nudging it along a plane as discussed above for nudging corner points. At a next step 1008, the method connects the endpoints and source points to form a polyline. The formed polyline is often a too coarse an approximation of the true building edge. As such, at a next step 1010, the method smooths the polyline. Smoothing a polyline will be discussed in further detail below for FIG. 14.

Figure 11:
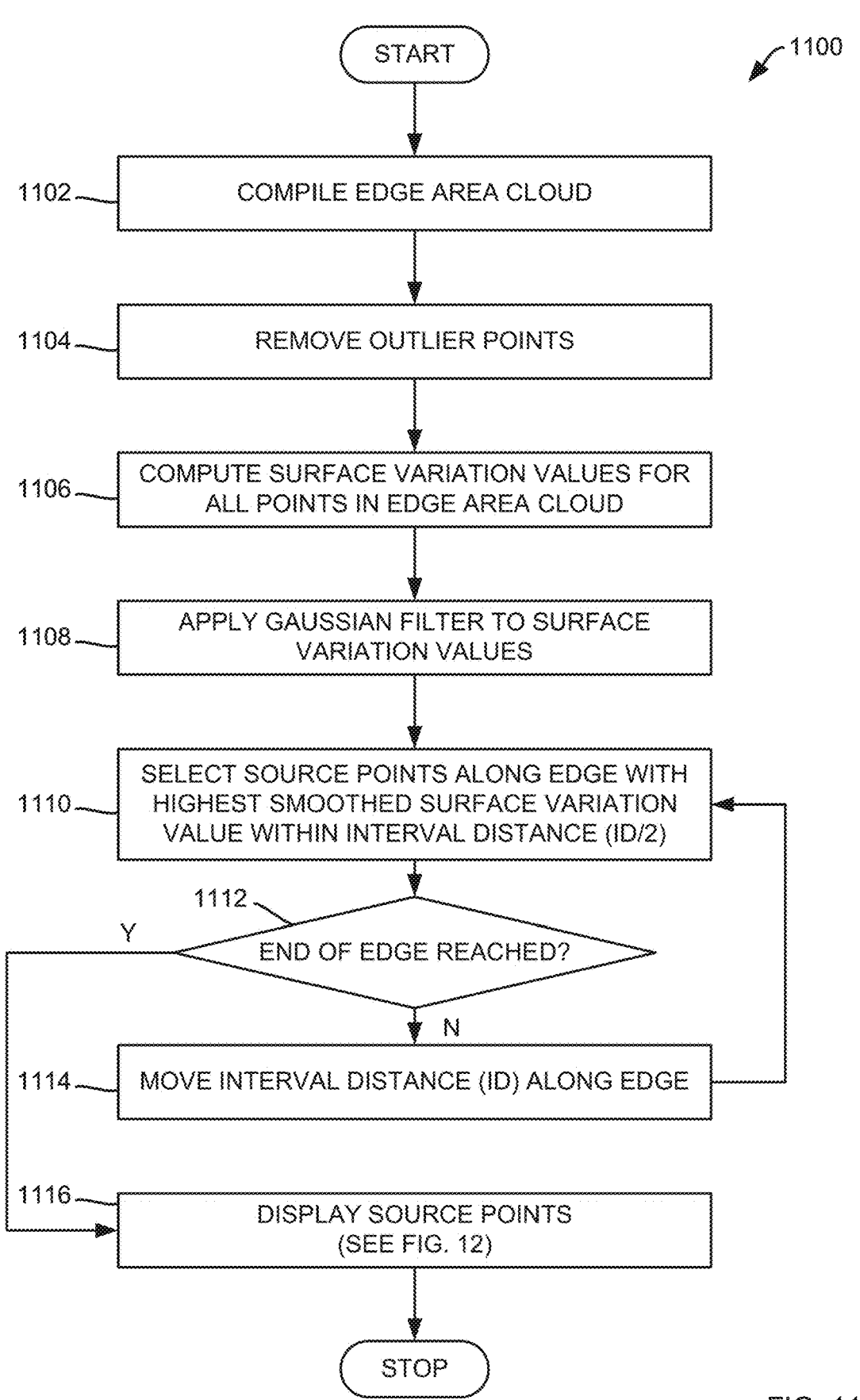
FIG. 11 is an illustrative flowchart of methods for finding source points in accordance with embodiments of the present invention.

FIG. 11 is an illustrative flowchart 1100 of methods for finding source points in accordance with embodiments of the present invention. In particular flowchart 1100 further illustrates a step 1004 (FIG. 10) above. At a first step 1102, the method compiles an edge area cloud. As utilized herein, an edge area cloud represents the set of all of the points in the building point cloud that are within an edge distance (ED) of the straight facade edge being edited. In embodiments, the ED is in a range of 20.0 to 60.0 cm. In an embodiment, a preferred ED is 20.0 cm. The method continues to a step 1104 to remove outlier points. In embodiments, the method utilizes a Statistical Outlier Removal (SOR) filter to remove outlier points from that set of points near the façade edge. The outlier points removed by the filter are introduced when sensor errors, reflective materials, or artifacts in the line of sight distort some of the measurements made by the laser scanner when capturing the point cloud, causing "junk" points a few millimeters out from the building surface to be added to the point cloud. Because these junk points are out apart from the surface, the outliers often have high surface variation values. Removing the outliers helps ensure that the points with the highest surface variation values are those close to the true building facade edge. At a next step 1106, the method computes surface variation values for all points remaining in the edge area cloud.

At a next step 1108, the method applies a spatial Gaussian filter to the computed surface variation valued. Applying a spatial Gaussian filter "smooths out" points' surface variation values by bringing them more in line with the average surface variation values of those nearby. If a point's individual surface variation value is high, the Gaussian filter reduces the value if the surface variation values of the point's neighbors are lower and increases the value further if the neighbors' surface variation values are higher. The filter is intended to reduce the potentially high surface variation values of isolated outliers—both the aforementioned "junk" points and, for instance, points corresponding to small bumps on facades. Once the spatial Gaussian filter is applied, the points with the highest surface variation values should be those that belong to a cluster of points with similarly high surface variation values, i.e. those along the true building edge. Once the Gaussian-smoothed surface variation values for all of the points in the edge area cloud have been computed, the method continues to a step 1110 to select source points along the façade edge with the highest smooth surface variation values.

Figure 12:
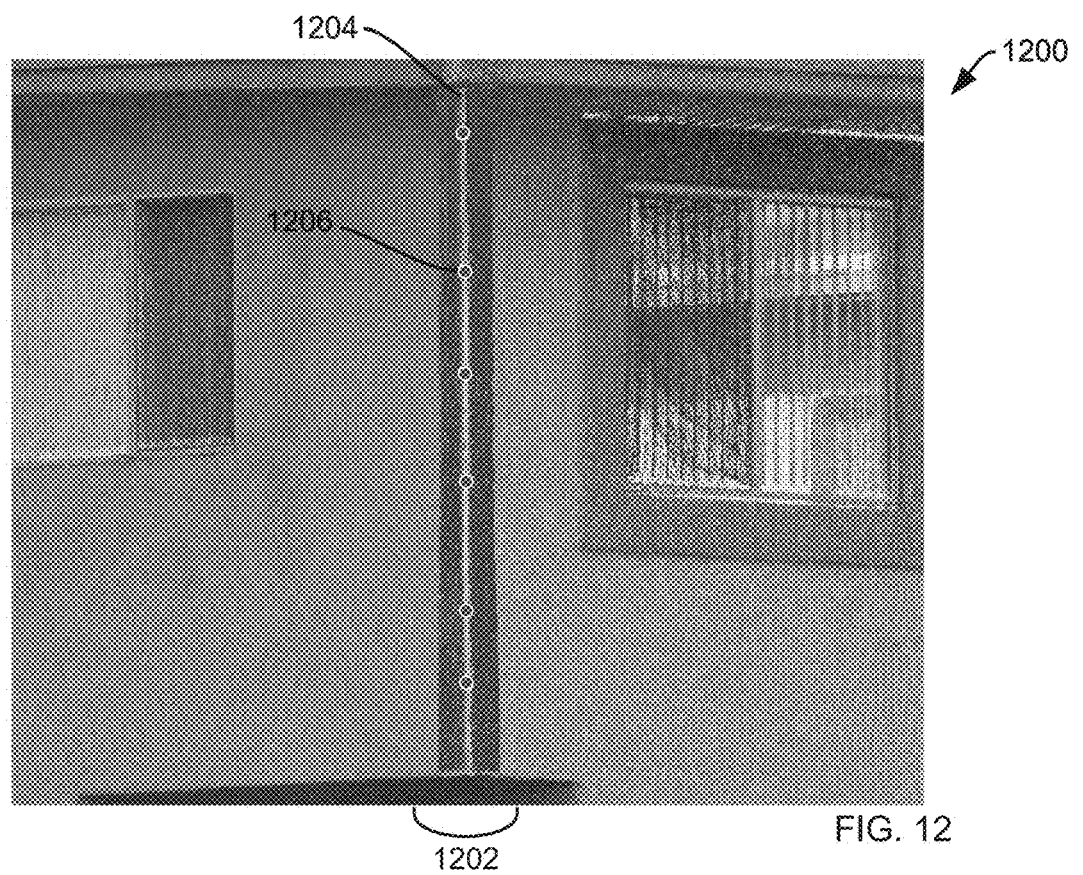
FIG. 12 is an illustrative representation of a point cloud portion with a colored edge area cloud and source points overlaid on an identified edge in accordance with embodiments of the present invention.

To ensure that the source points are roughly evenly distributed across the edge, and thus that the eventual curve accurately matches all parts of the edge, the method works its way along the straight facade edge from one endpoint to another, pausing to choose a source point from the area near its current position at regular intervals. As such, the method begins at a first endpoint of the selected edge and moves an interval distance (ID) to a next position along the selected edge. The method then selects a next source point having a highest smoothed surface variation value among all of the points in the edge area cloud that are located within one-half of the interval distance (ID/2) of the next position on the selected edge. In embodiments, the ID is in a range of 10.0 to 60.0 cm. In a preferred embodiment, the ID is approximately 30.0 cm. At a next step 1112, the method determines whether the end of the façade edge (i.e. the endpoint) is reached. If the method determines at a step 1112 that the endpoint is not reached, the method continues to a step 1114 to move the ID to a next position and continues to a step 1110. In this manner, the method continues moving along the façade edge and stopping every ID to pick out another source point from the local area. If the method determines at a step 1112 that the endpoint is reached, the method continues to a step 1116 to display the source points as shown in FIG. 12, which is an illustrative representation of point cloud portion 1200 with identified edge 1202 in accordance with embodiments of the present invention. As illustrated, colored edge area cloud 1204 and source points 1206 are overlaid on identified edge 1202. The user can then examine the source points and, if needed, interactively adjust their positions to ensure that they lie exactly on the true building edge.

Figure 13:
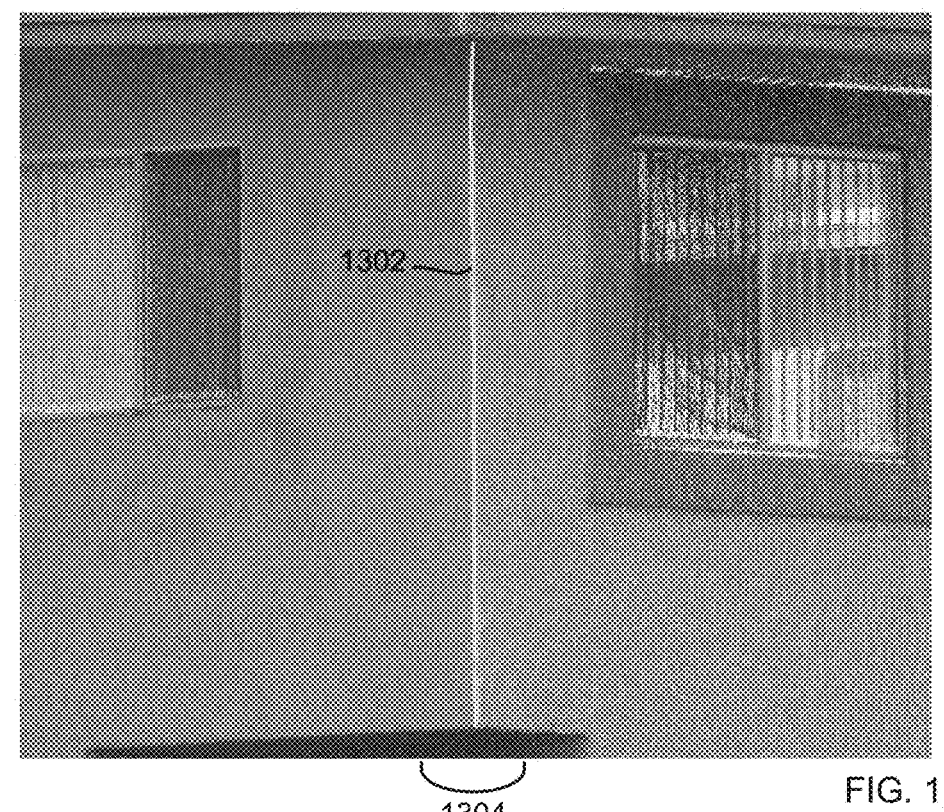
FIG. 13 is an illustrative representation of a point cloud portion with a smoothed polyline overlaid on a building edge in accordance with embodiments of the present invention.
Figure 14:
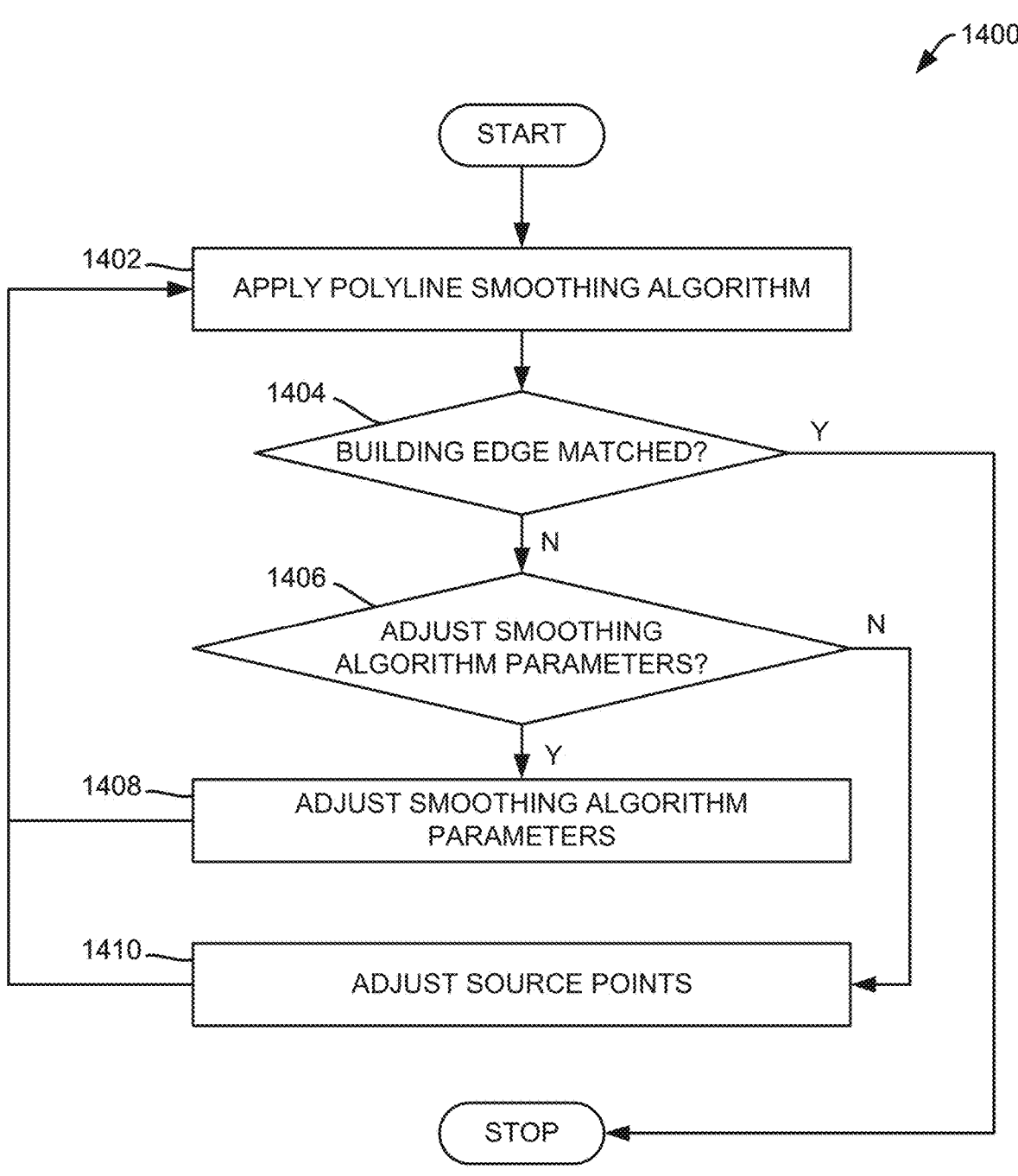
FIG. 14 is an illustrative flowchart of methods for smoothing a polyline in accordance with embodiments of the present invention.

FIG. 14 is an illustrative flowchart 1400 of methods for smoothing a polyline in accordance with embodiments of the present invention. In particular flowchart 1400 further illustrates a step 1010 (FIG. 10) above. At a first step 1402, the method applies a polyline smoothing algorithm to the polyline. In an embodiment, the polyline smoothing algorithm is a Chaikin's algorithm. In general, Chaikin's algorithm smooths a curve by iteratively replacing every point by two new points: one ¼ of the way to the next point and one ¼ of the way to the previous point. The method continues to a step 1404 to determine whether the smoothed polyline or refined edge matches the selected edge represented by the building. If the method determines at a step 1404 that the polyline or refined edge matches the building edge, the method ends. If the method determines at a step 1404 that the polyline or refined edge does not match the building edge, the method continues to a step 1406 to determine whether to adjust the smoothing algorithm parameters. If the method determines at a step 1406 to adjust the smoothing algorithm parameters, the method continues to a step 1408 to adjust the smoothing algorithm parameters whereupon the method returns to a step 1402 to apply the polyline smoothing algorithm. In some embodiments, the smoothing algorithm parameters include a ratio parameter and number of iterations parameter. In embodiments, ratio governs how aggressively the polyline is smoothed, and number of iterations controls how complex the smoothed polyline can get. If the method determines at a step 1406 to not adjust the smoothing algorithm parameters, the method continues to a step 14010 to adjust the source points whereupon the method returns to a step 1402 to apply the polyline smoothing algorithm. Turning to FIG. 13, FIG. 13 is an illustrative representation of a point cloud portion 1300 with smoothed polyline 1302 overlaid on building edge 1304 in accordance with embodiments of the present invention. The method may be repeated as necessary until a satisfactory result is achieved.

Fenestration Delineation

Figure 15:
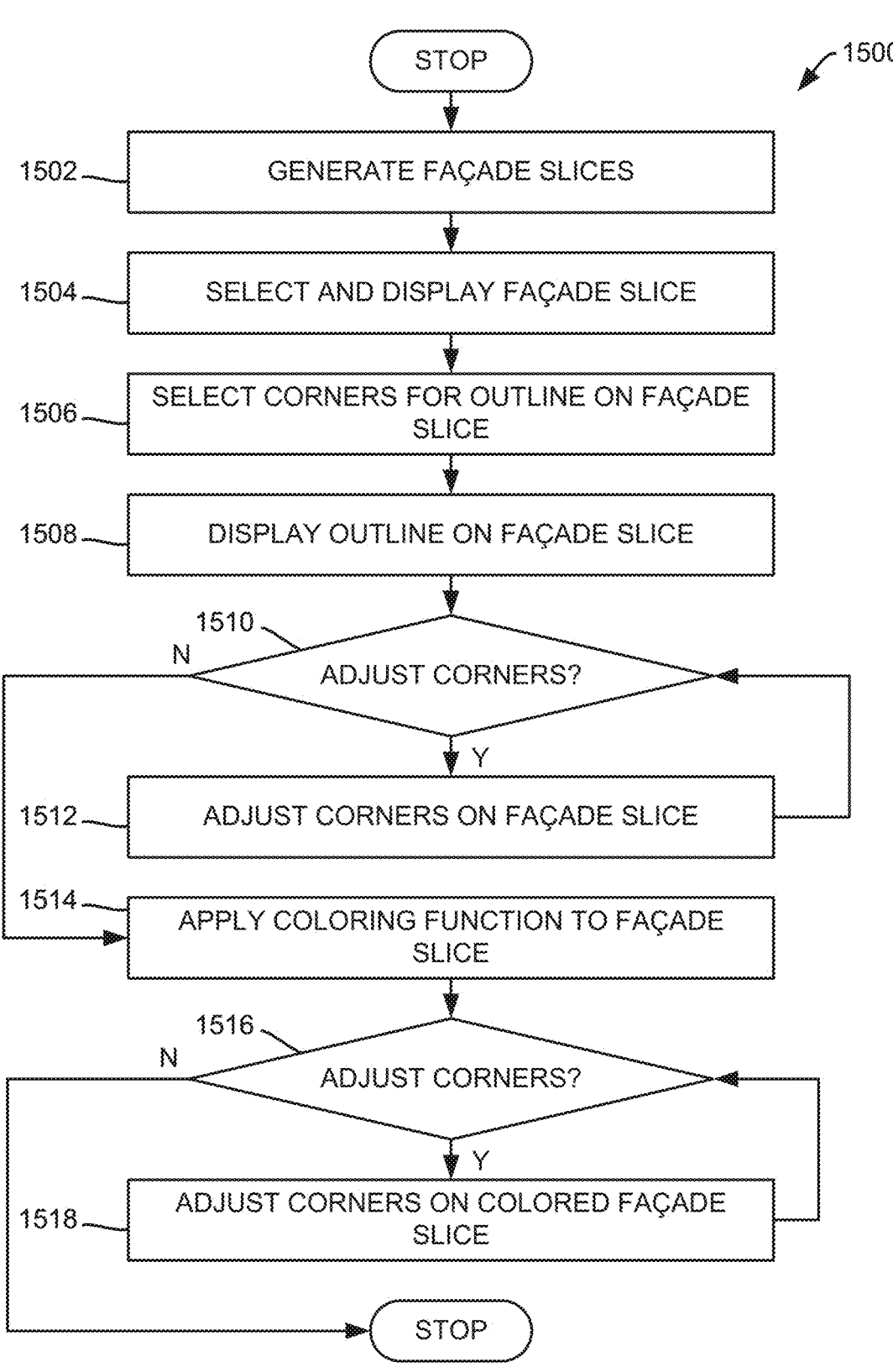
FIG. 15 is an illustrative flowchart of methods for fenestration delineation in accordance with embodiments of the present invention.
Figure 16:
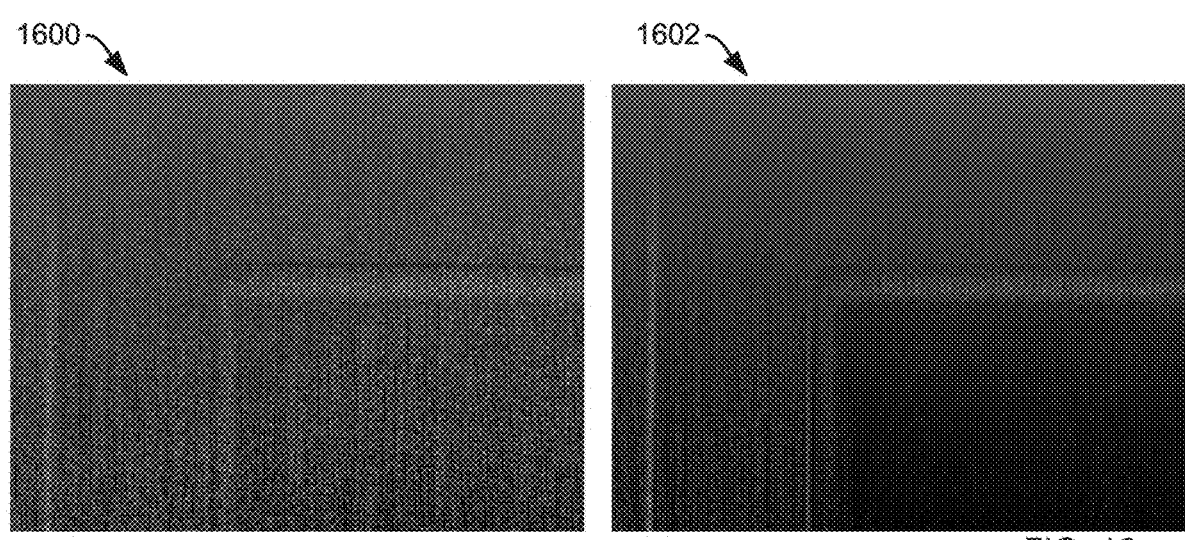
FIG. 16 is an illustrative representation of a point cloud portion and a corresponding façade slice portion in accordance with embodiments of the present invention.

FIG. 15 is an illustrative flowchart 1500 of methods for fenestration delineation in accordance with embodiments of the present invention. In addition to extremely exact facade dimensions, recladding projects also require ultra-precise delineations of the outlines of a building's windows and doors so that the cutouts made in the insulation panels to accommodate the windows and doors can be sized correctly. Methods for fenestration delineation allow the user to interactively draw and edit window and door outlines, offering several different point cloud colorings designed to highlight the shapes and boundaries of window and door frames in the building point cloud. As such, at a first step 1502, the method generates a number of façade slices from the point cloud and the building wireframe model. For each of the facades of a building, an automatic facade segmentation process automatically segments out exactly those points from the point cloud that belong to that facade, such that a point cloud "slice" is created for each facade. The process then uses an algorithm like RANSAC to fit planes to each of those slices, generating simplified planar representations of each of the facades ("facade planes"). At a next step 1504, the method selects and displays a façade slice. Turning briefly to FIG. 16, FIG. 16 is an illustrative representation of point cloud portion 1600 and a corresponding façade slice portion 1602 in accordance with embodiments of the present invention. In embodiments, showing only the facade slice instead of the entire building point cloud makes it easier for the user to find the window or door boundary, since there aren't points behind the facade slice filling the visual "gaps" in the slice that can indicate where the boundary is.

Returning to FIG. 15, at a next step 1506, the method selects points on the façade slice that correspond with the corners of a fenestration. These corners are then connected to form an outline which may be displayed on the façade slice at a step 1508. The method then determines, at a step 1510, whether to adjust the corners of the fenestration. If the method determines, at a step 1510, to adjust the corners of the fenestration, the method continues to a step 1512 to allow the user to move or nudge a selected corner(s) in a manner similar to that described above for corner refinement and edge refinement. It is noted that corners may be moved at any time after initial selection of a corner without limitation. If the method determines, at a step 1510, not to adjust the corners of the fenestration, the method continues to a step 1514 to color all points of the façade slice using a coloring function to reveal details corresponding with the fenestration. Use of a coloring function may provide addi-

13

Figure 17:
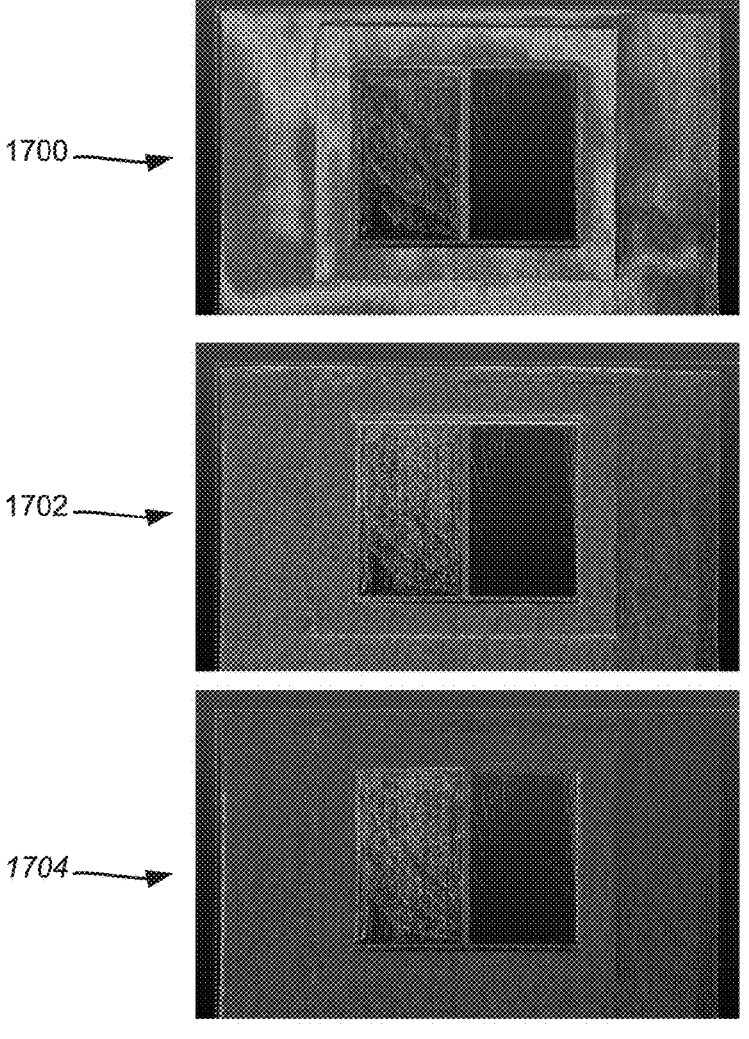
FIG. 17 is an illustrative representation of a façade slice portion with various coloring functions applied in accordance with embodiments of the present invention.

14 tional detail to a user regarding the fenestration. Any coloring function known in the art may be utilized without limitation and without departing from embodiments disclosed herein. Turning briefly to FIG. 17, FIG. 17 is an illustrative representation of a facade slice portion with various coloring functions applied in accordance with embodiments of the present invention. As illustrated, height ramp coloring function 1700, vertical coloring function 1702, and normal change rate coloring function 1704 provide varying details of the selected fenestration that may assist a user in more accurately outlining the fenestration. In embodiments, coloring function parameters may be adjusted to enhance details. For example, a banding frequency parameter may be adjusted in a range of approximately 8.0 mm to 8.0 cm for a height ramp coloring function. In another example, a neighborhood radius parameter may be adjusted in a range of approximately 5.0 mm to 4.0 cm for a verticality coloring function. In still another example, a neighborhood radius parameter may be adjusted in a range of approximately 8.0 mm to 4.0 cm for a normal change rate coloring function. The verticality and "estimated surface curvature" values that define the verticality and normal change rate coloring functions are "neighborhood" based values. That is, the verticality or "estimated surface curvature" value for a given point P is computed by examining all of the points within a certain "neighborhood radius" r of P and either fitting a surface to those points or computing statistics based on their positions. The optimal value of r—i.e. the value of r for which window and door boundaries are most clearly highlighted when one of the point cloud colorings is applied—is partially dependent on the density of the point cloud and the particular geometry of the window and door boundaries. At any time, a user can adjust parameters to change the value of r used for each of the two point cloud colorings.

Returning to FIG. 15, at a next step 1516, the method determines whether to adjust the corners based on details exposed by a selected coloring function. If the method determines at a step 1516 to adjust the corners, the method continues to a step 1518 to adjust the corners on the colored façade slice. Window and door boundaries, frames, or other details are likely to be much more visible in the facade slice with one of the three colorings applied than with the original point cloud colors. If the method determines at a step 1516 not to adjust the corners, the method ends.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for fenestration delineation of a building wireframe model, the method comprising:
   providing a point cloud of a building;
   providing the building wireframe model generated from the point cloud,
   generating a plurality of façade slices from the point cloud and the building wireframe model;
   selecting one of the plurality of façade slices;
   displaying the selected façade slice;
   selecting a plurality of points on the selected façade slice, wherein the plurality of points corresponds with corners of a fenestration;
   connecting the corners to present an outline of the fenestration;
   displaying the outline on the façade slice; and
   adjusting the corners by a user to match the fenestration, wherein the adjusting the corners to match the fenestration occurs any time after the selecting the plurality of points.

2. The method of claim 1, further comprising:
   coloring all points of the selected façade slice using a coloring function to reveal details corresponding with the fenestration; and
   adjusting the corners by the user to match the fenestration based on the coloring.

3. The method of claim 2, wherein the coloring function is selected from the group consisting of: height ramp coloring function, verticality coloring function, and normal change rate coloring function.

4. The method of claim 3, further comprising:
   adjusting a coloring function parameter; and
   displaying the selected façade slice using the adjusted coloring function.

5. The method of claim 4, wherein the coloring function parameter corresponding with the height ramp coloring function is a banding frequency.

6. The method of claim 5, wherein the banding frequency is in a range of 8.0 mm to 8.0 cm.

7. The method of claim 4, wherein the coloring function parameter corresponding with the verticality coloring function is a neighborhood radius.

8. The method of claim 7, wherein the neighborhood radius is in a range of 5.0 mm to 4.0 cm.

9. The method of claim 4, wherein the coloring function parameter corresponding with the normal change rate coloring function is a neighborhood radius.

10. The method of claim 9, wherein the neighborhood radius is in a range of 8.0 mm to 4.0 cm.

* * * * *